UNITED STATES PATENT OFFICE.

WILLIAM B. ROYALL, OF BRENHAM, TEXAS.

IMPROVEMENT IN INSECT-DESTROYING COMPOUNDS.

Specification forming part of Letters Patent No. 140,079, dated June 17, 1873; application filed May 22, 1873.

*To all whom it may concern:*

Be it known that I, WILLIAM B. ROYALL, of Brenham, in the county of Washington and State of Texas, have invented a new and Improved Compound for Destroying the Cotton-Worm and other Insects that infest, eat, and damage the leaves of the cotton-plant; and I do hereby declare the following to be a full, clear, and exact description of the same.

The invention relates to compound for killing the cotton-worm and other insects that infest, eat, and damage the leaves of the cotton-plant. It consists in combining a poisonous, an adhesive, and a diffusive ingredient in one and the same compound, as hereinafter described and claimed.

In order to form my compound I use the following ingredients and preferably in the following proportions: Paris green, one pound; cobalt, two ounces; flour, seventeen pounds: powdered gum tragacanth, three ounces; powdered licorice-root, six ounces.

The first two ingredients constitute the death-dealing poison, and the third an intermediary adhesive placed between the bedewed leaf of the plant and the poison to retain the poison on the leaf, while the fourth and fifth act as a vehicle to transfer and spread the poison over the whole surface of the leaf. The compound being thus brought into contact with every part of the leaf there is no possible escape for the insect or worm if it bites the leaf at any point.

The compound is dusted on the leaves of the plants when there is little or no wind and when the dew is upon them.

I am aware that poisons have been heretofore applied to the leaves of plants, and caused to adhere by means of gum, flour, or other adhesive; but it is believed that these have heretofore lacked practicability to a great extent from failing to cover sufficient area on the surface of the leaf.

Having thus described my invention, what I claim as new, and desire to secure by Letters Patent, is—

An insect compound composed of Paris green, cobalt, flour, and tragacanth, and licorice, mixed and applicable substantially in the manner set forth.

WILLIAM B. ROYALL.

Witnesses:
   H. B. JONES,
   LYDDLETON SMITH.